(12) United States Patent
Goka et al.

(10) Patent No.: US 8,904,854 B2
(45) Date of Patent: Dec. 9, 2014

(54) AIR FLOW MEASUREMENT DEVICE

(75) Inventors: Yasushi Goka, Utsunomiya (JP); Yasushi Kohno, Obu (JP); Takashi Ooga, Kariya (JP)

(73) Assignee: Denso Corporation, Kariya (JP)

( * ) Notice: Subject to any disclaimer, the term of this patent is extended or adjusted under 35 U.S.C. 154(b) by 199 days.

(21) Appl. No.: 13/412,644

(22) Filed: Mar. 6, 2012

(65) Prior Publication Data

US 2012/0240668 A1     Sep. 27, 2012

(30) Foreign Application Priority Data

Mar. 24, 2011   (JP) .................................. 2011-66061

(51) Int. Cl.
*G01M 15/04* (2006.01)
*G01F 1/684* (2006.01)
*G01F 5/00* (2006.01)
*G01F 1/72* (2006.01)

(52) U.S. Cl.
CPC ............... *G01F 1/6842* (2013.01); *G01F 5/00* (2013.01); *G01F 1/72* (2013.01)
USPC ...................................................... 73/114.32

(58) Field of Classification Search
USPC ............... 73/114.31, 114.32, 114.33, 114.34, 73/114.37
See application file for complete search history.

(56) References Cited

U.S. PATENT DOCUMENTS

| | | | | |
|---|---|---|---|---|
| 5,467,648 A | * | 11/1995 | Igarashi et al. | ............. 73/202.5 |
| 5,696,321 A | | 12/1997 | Igarashi et al. | |
| 5,804,718 A | * | 9/1998 | Nagasaka et al. | ................ 73/202 |
| 6,220,090 B1 | | 4/2001 | Kohno et al. | |
| 7,665,351 B2 | * | 2/2010 | Kamiya | ..................... 73/114.32 |
| 8,701,474 B2 | * | 4/2014 | Tagawa | ..................... 73/114.32 |
| 2003/0046996 A1 | | 3/2003 | Nakada et al. | |
| 2006/0021429 A1 | * | 2/2006 | Konzelmann et al. | ........ 73/202.5 |
| 2007/0056363 A1 | | 3/2007 | Ban et al. | |
| 2007/0062275 A1 | * | 3/2007 | Beyrich et al. | ............. 73/204.21 |
| 2007/0062276 A1 | * | 3/2007 | Konzelmann et al. | ...... 73/204.21 |
| 2007/0068246 A1 | | 3/2007 | Uramachi | |
| 2008/0307869 A1 | * | 12/2008 | Kamiya | ..................... 73/114.32 |
| 2012/0079889 A1 | * | 4/2012 | Kohno | ............................ 73/861 |
| 2012/0103084 A1 | * | 5/2012 | Ooga et al. | ................ 73/204.25 |

FOREIGN PATENT DOCUMENTS

| | | |
|---|---|---|
| JP | 7-113672 | 5/1995 |
| JP | 7-209051 | 8/1995 |

(Continued)

OTHER PUBLICATIONS

Office Action (2 pages) dated Jan. 15, 2013 issued in corresponding Japanese Application No. 2011-066061 and English translation (3 pages).

*Primary Examiner* — Eric S McCall

(74) *Attorney, Agent, or Firm* — Nixon & Vanderhye PC

(57) ABSTRACT

An air flow measurement device arranged in an intake passage includes a bypass passage having an inlet from which a part of a main flow of an intake air is introduced, and an outlet from which the introduced intake air flows out. A sensor is located in the bypass passage to generate an electrical signal, and the bypass passage communicates with the intake passage through a hole portion. The outlet is open toward a downstream side of the intake passage in a flow direction of the main flow of the intake air. The hole portion is located within an outlet projected area that is provided by projecting an open area of the outlet in straight and toward upstream in the flow direction of the main flow on a projection surface perpendicular to the flow direction of the main flow.

8 Claims, 5 Drawing Sheets

(56) References Cited

FOREIGN PATENT DOCUMENTS

| JP | 08-114475 | 5/1996 |
| JP | 2003-083788 | 3/2003 |
| JP | 2007-093422 | 4/2007 |
| JP | 2009-145162 | 7/2009 |

* cited by examiner

UPSTREAM ←——→ DOWNSTREAM
MAIN INTAKE
AIRFLOW

UPSTREAM ←→ DOWNSTREAM
MAIN INTAKE AIRFLOW

UPSTREAM ←⎯⎯⎯⎯→ DOWNSTREAM
MAIN INTAKE AIRFLOW

AIR FLOW MEASUREMENT DEVICE

CROSS REFERENCE TO RELATED APPLICATION

This application is based on and incorporates herein by reference Japanese Patent Application No. 2011-066061 filed on Mar. 24, 2011.

TECHNICAL FIELD

The present disclosure relates to an air flow measurement device which measures an air flow rate.

BACKGROUND

Conventionally, an air flow measurement device, which measures an air flow rate by utilizing heat transfer with air, is generally known. The air flow measurement device is arranged, for example, in an intake passage communicating with an internal combustion engine, and is used for measuring a flow rate of air flowing into the internal combustion engine.

For example, as shown in FIG. 5, an air flow measurement device 100 is arranged in an intake passage 101, and introduces therein a part of intake air to generate an electrical signal in accordance with a flow rate of the introduced air. The air flow measurement device 100 includes a bypass passage 103 through which a part of the introduced air flows, and the bypass passage 103 accommodates therein a sensor chip 102 which generates an electrical signal by heat transfer with the air. The sensor chip 102 of the air flow measurement device 100 is not arranged directly in the intake passage 101 through which a main flow of intake air passes, but is arranged in the bypass passage 103 not to be affected by turbulence of the main flow of intake air flowing in the intake passage 101. Thus, the sensor chip 102 can output a measurement value having little variation.

Moreover, because the sensor chip 102 is arranged in the bypass passage 103, a measurement value of the sensor chip 102 is restricted from decreasing from a true value, which is caused by pulsation of the main flow of intake air. The measurement value of the sensor chip 102 can be increased in accordance with increase of a flow length ratio L2/L1. Here, L1 is a flow length of air, which flows straight in the intake passage 101 without introduced into the air flow measurement device 100, from a position corresponding to an inlet of the air flow measurement device 100 to a position corresponding to the outlet of the air flow measurement device 100 in a flow direction of the main flow of the intake air, and L2 is a flow length of air flowing totally in the bypass passage 103. That is, the air flow measurement device 100 has a correction function, such that the decrease of the measurement value due to the pulsation can be prevented by setting the ratio L2/L1 to be a desired value.

In recent years, an amplitude of the pulsation of intake air tends to increase with the spread of exhaust gas recirculation (EGR), and therefore, a counter flow is generated periodically. To that end, technologies are proposed, in which influence of the pulsation on the measurement value (i.e., decrease of the measurement value) is limited by reducing an inflow of the counter flow into the bypass passage 103.

For example, in an air flow measurement device described in Patent Document 1 (JP 2007-309909A corresponding to US 2007/0056363A), a side wall of an outlet of a bypass passage has a slit, and a part of a counter flow is let out through the slit to reduce a flow rate of the counter flow which reaches a sensor chip.

In an air flow measurement device described in Patent Document 2 (JP 07-113672A), a gate which guides a counter flow is provided separately from an outlet of a bypass passage. The counter flow introduced into the gate is blown out to a lateral side of another counter flow, which is introduced into the bypass passage through the outlet of the bypass passage. Accordingly, the counter flow having entered into the bypass passage through the outlet is directed toward another passage which does not have a sensor chip. Thus, a flow rate of a counter flow, which reaches a sensor chip, is reduced.

In an air flow measurement device described in Patent Document 3 (JP 07-209051A), similarly to the air flow measurement device described in Patent Document 2, a counter flow, which flows into a bypass passage through an outlet of the bypass passage, is directed toward another passage which does not have a sensor chip. Additionally, the flow passage, to which the counter flow introduced from the outlet of the bypass passage is directed, also has another sensor chip, and is capable of measuring a flow rate of the counter flow. However, in any one of the above-described air flow measurement devices, the counter flow in the bypass passage cannot return to the intake passage if a flow direction of the counter flow introduced into the bypass passage is not changed. Thus, if the amplitude of the pulsation of intake air more increases, it may become difficult to effectively limit the influence of the counter flow.

SUMMARY

The present disclosure addresses at least one of the above disadvantages.

According to an aspect of the present disclosure, an air flow measurement device to be arranged in an intake passage, through which intake air flows to an internal combustion engine, includes a bypass passage, a sensor and a hole portion. The bypass passage has an inlet from which a part of a main flow of the intake air is introduced into the bypass passage, and an outlet from which the introduced intake air flows out. The sensor is located in the bypass passage to generate an electrical signal by heat transfer with the introduced intake air in accordance with a flow rate of the introduced intake air. The bypass passage communicates with the intake passage through the hole portion. The outlet is open toward a downstream side of the intake passage in a flow direction of the main flow of the intake air. The hole portion is located within an outlet projected area that is provided by projecting an open area of the outlet in straight and toward upstream in the flow direction of the main flow on a projection surface perpendicular to the flow direction of the main flow.

According to the above-described configuration of the air flow measurement device, a counter flow having entered into the bypass passage through the outlet can flow straight, while keeping its flow direction at the time of entering into the bypass passage, and can thereby easily reach the outlet projected area to return to the intake passage through the hole portion. Therefore, influence of the counter flow to a measurement value of the sensor can be limited.

BRIEF DESCRIPTION OF THE DRAWINGS

The disclosure, together with additional objectives, features and advantages thereof, will be more readily understood from the following description, the appended claims and the accompanying drawings in which:

DETAILED DESCRIPTION (Embodiments)

Figure 1:
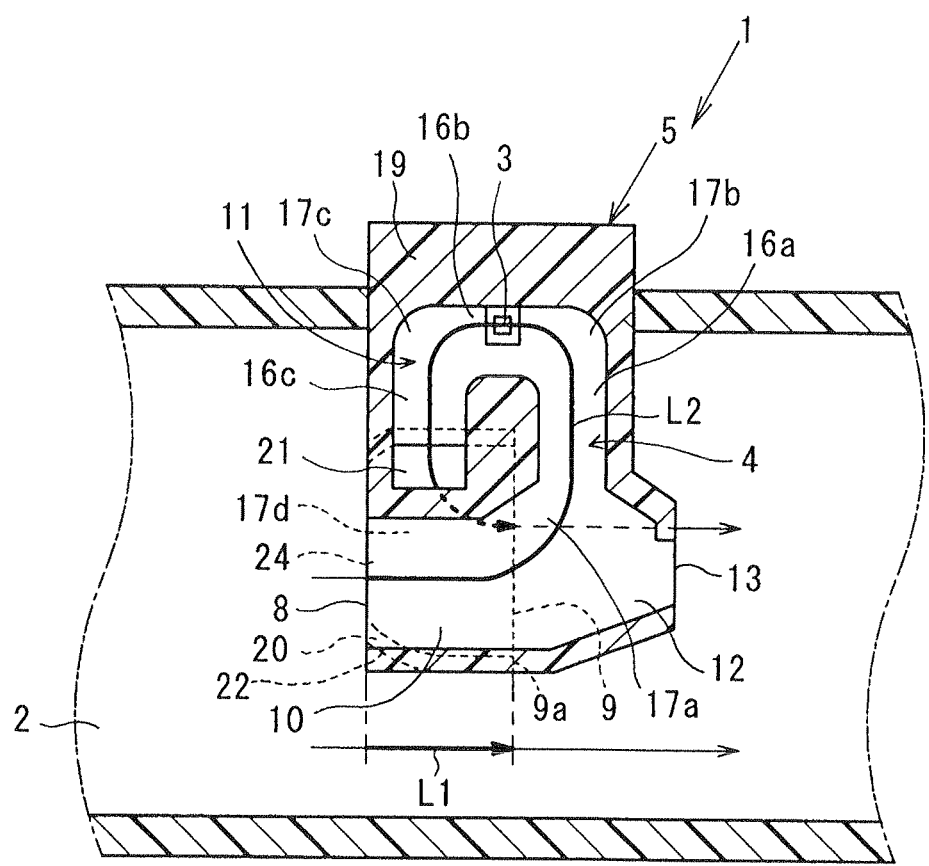
FIG. 1 is a schematic sectional view showing an air flow measurement device arranged in an intake passage, according to an exemplar embodiment of the present disclosure.

An air flow measurement device 1 of an exemplar embodiment will be described in reference to FIGS. 1 to 2D. The air flow measurement device 1 is arranged in an intake passage 2, which communicates with an internal combustion engine (not shown), to measure a flow rate (intake airflow rate) of air flowing into the engine by utilizing heat transfer with air. The air flow measurement device 1 is disposed to introduce therein a part of main intake air flowing in the intake passage 2, and to generate an electrical signal in accordance with the intake airflow rate of the introduced air.

The air flow measurement device 1 includes a housing 5 defining therein a bypass passage 4, through which the introduced air flows, and a sensor chip 3 used as an example of a sensor and arranged in the bypass passage 4 to generate an electrical signal which indicates an intake airflow rate. The electrical signal generated in the sensor chip 3 is subjected to predetermined treatment, and is outputted to an electronic control device outside the air flow measurement device 1. Subsequently, the generated electrical signal is used, for example, for various control processes such as a fuel injection control.

The bypass passage 4 includes an inlet 8 therein open toward an upstream side of the intake passage 2 in a flow direction of the main intake air, an outlet 9 that is open toward a downstream side of the intake passage 2 in the flow direction of the main intake air, a straight passage 10 extending straight from the inlet 8 to guide air introduced into the bypass passage 4 in the same direction as the flow direction of the main intake air, and a round passage 11 configured to make the introduced air having passed straight in the straight passage 10 turn in a round and flow to the outlet 9. The straight passage 10 communicates straight with a dust discharge passage 12 through which dust is discharged, and a downstream end of the dust discharge passage 12 in the air flow direction has a dust discharge port 13 that is open toward the downstream side of the intake passage 2 in the flow direction of the main intake air.

The sensor chip 3 is arranged in the round passage 11 and projects into an area where air flows in an opposite direction from the flow direction of the main intake air. The round passage 11 is branched into two passages at a position downstream of the sensor chip 3 in a flow direction of air flowing in the round passage 11, and two outlet parts (9) are provided at downstream ends of the two passages branched from the round passage 11. The branched two outlet parts are adopted as the outlet 9 in the exemplar embodiment.

In the air flow measurement device 1, the sensor chip 3 is not arranged directly in the intake passage 2 through which the main intake air flows, but is arranged in the bypass passage 4. Accordingly, the sensor chip 3 can be protected from a direct influence of turbulence of the main intake air, and can thereby output a measurement value having little variation.

Moreover, the measurement value of the sensor chip 3 can be increased in accordance with a flow length ratio L2/L1. Here, L1 is a flow length of air, which flows straight in the intake passage 2 without being introduced into the air flow measurement device 1, from a position corresponding to the inlet 8 to a position corresponding to the outlet 9 in the flow direction of the main intake air, and L2 is a flow length of air flowing totally in the bypass passage 4. Therefore, reduction of the measurement value caused by pulsation of intake air can be prevented.

The detail structure of the air flow measurement device 1 according to the exemplar embodiment will be described in reference to FIGS. 1 to 2D. In the above-described configuration of the air flow measurement device 1, air introduced into the air flow measurement device 1 through the inlet 8 flows into the straight passage 10 in the same direction as the flow direction of the main intake air, and reaches a branching part in which the round passage 11 and the dust discharge passage 12 are branched from each other. At the branching part, a large portion of the air flows into the round passage 11, and a small portion of the air flows into the dust discharge passage 12.

The round passage 11 includes three straight paths. Specifically, the round passage 11 includes a first straight path 16a arranged to guide approximately in straight an air flow having curved at the branching part in which the straight passage 10 is branched into the round passage 11 and the dust discharge passage 12, a second straight path 16b accommodating the sensor chip 3 and arranged to guide an air flow approximately in straight in the opposite direction from the direction of the main intake air, and a third straight path 16c arranged to guide approximately in straight an air flow having passed through the sensor chip 3 to the position where the round passage 11 is branched into the two passages.

Additionally, the round passage 11 includes five curved paths. That is, the round passage 11 includes a first curved path 17a which curves and connects together the straight passage 10 and the first straight path 16a, a second curved path 17b which curves and connects together the first straight path 16a and the second straight path 16b, a third curved path 17c which curves and connects together the second straight path 16b and the third straight path 16c, and two fourth curved paths 17d which curve and connect together the third straight path 16c and the two outlets of the outlet 9. Downstream ends of the fourth curved paths 17d communicate with the outlet parts directly.

Thus, air introduced into the round passage 11 through the straight passage 10 reaches the outlet 9 after passing through the first curved path 17a, the first straight path 16a, the second curved path 17b, the second straight path 16b, the third curved path 17c, the third straight path 16c, and the fourth curved paths 17d in this order. During this, air passes through the sensor chip 3 in the second straight path 16b, and an electrical signal is produced by heat transfer between the sensor chip 3 and the air.

The housing 5 includes a main body 19 which defines independently, for example, the inlet 8, the straight passage 10, the dust discharge passage 12 and the dust discharge port 13. The housing 5 further includes two outlet covers 20 which define the two outlet parts of the outlet 9 together with the main body 19. The first to third straight paths 16a to 16c and the first to third curved paths 17a to 17c of the round passage 11 are provided in the main body 19, and the fourth curved paths 17d are provided, such that the outlet covers 20 cover both sides of the main body 19 in a direction perpendicular to the flow direction of main intake air.

More specifically, the both sides of the main body 19 in the direction perpendicular to the flow direction of main intake air has a pair of windows 21 respectively through which the third straight path 16c and the fourth curved paths 17d communicate with each other. Thus, air having passed through the third straight path 16c flows into the fourth curved paths 17d through the windows 21 and reaches the outlet parts of the outlet 9. Furthermore, as shown in FIG. 2D, an outer wall surface of each of the outlet covers 20, which is referred to as a curved surface 22 hereinafter, is tapered toward upstream in the flow direction of the main intake air and protrudes outward to be curved smoothly. A downstream end of the curved surface 22 is an outlet rim 9a which define the outlet 9.

Figure 2A:
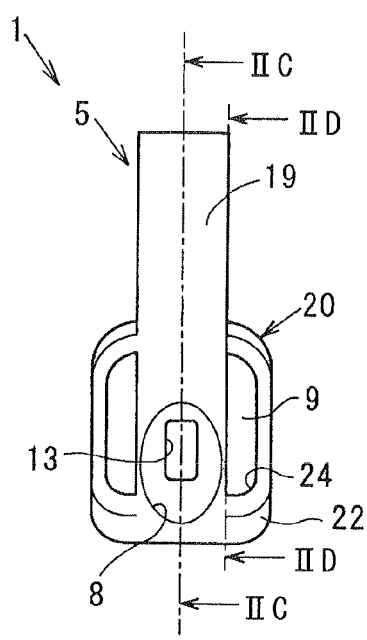
FIG. 2A is a rear view showing the air flow measurement device when viewed from an upstream side of the intake passage in a flow direction of air flowing in the intake passage, according to the exemplar embodiment.
Figure 2B:
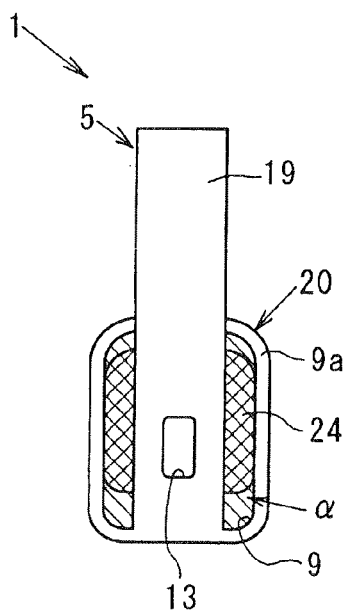
FIG. 2B is a front view showing the air flow measurement device when viewed from a downstream side of the intake passage in the flow direction of air flowing in the intake passage, according to the exemplar embodiment.
Figure 2C:
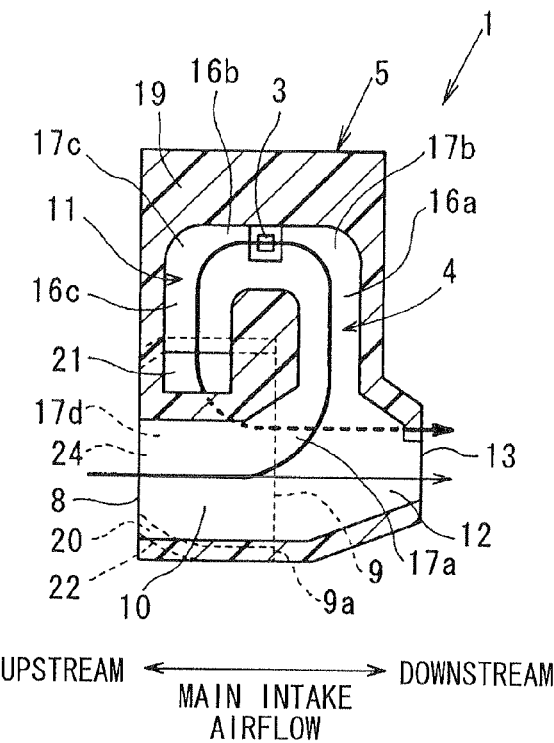
FIG. 2C is a sectional view taken from a line IIC-IIC in FIG. 2A.
Figure 2D:
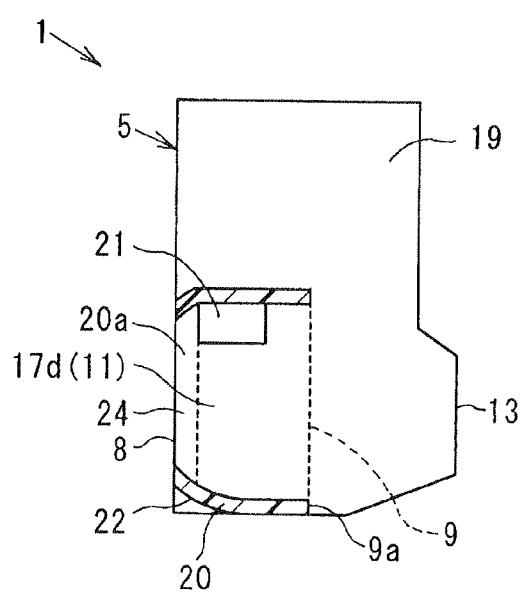
FIG. 2D is a sectional view taken from a line IID-IID in FIG. 2A.
Figure 3A:
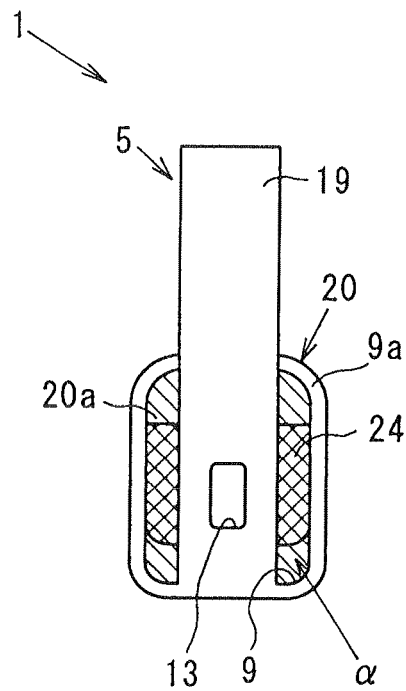
FIGS. 3A to 3C are front views showing air flow measurement devices respectively, when viewed from a downstream side of an intake passage in a flow direction of air flowing in the intake passage, according to another exemplar embodiments of the present disclosure.
Figure 3C:
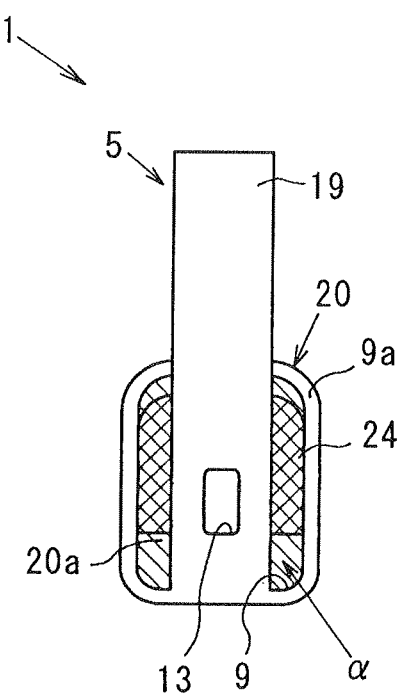
Figure 3B:
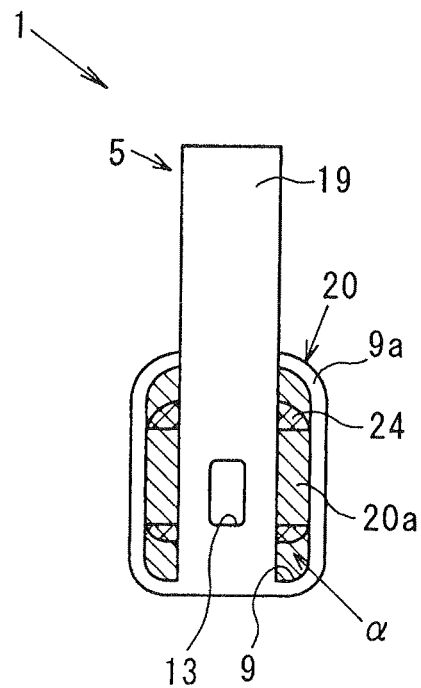
Figure 4A:
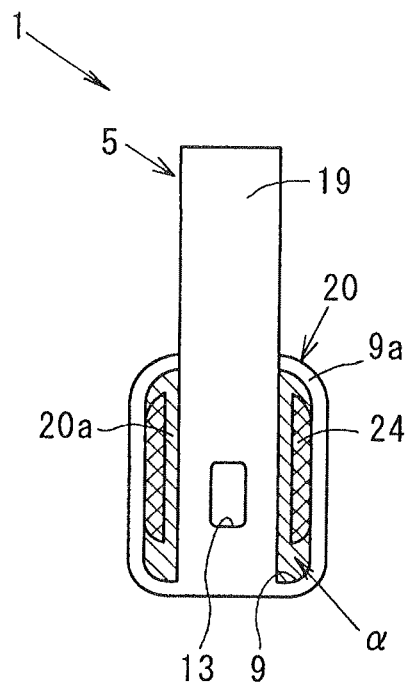
FIGS. 4A to 4C are front views showing air flow measurement devices respectively, when viewed from a downstream side of an intake passage in a flow direction of air flowing in the intake passage, according to another exemplar embodiments of the present disclosure.
Figure 4C:
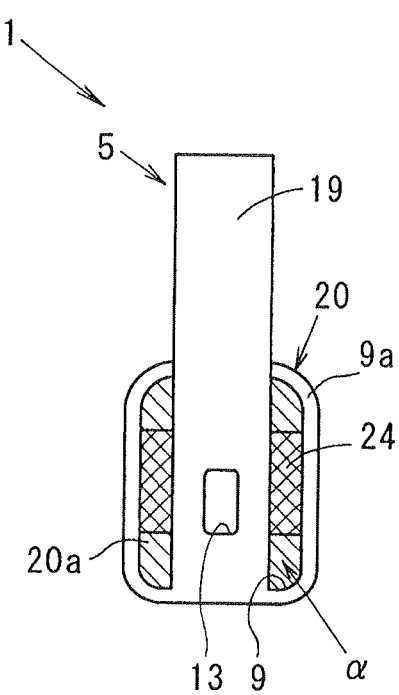
Figure 4B:
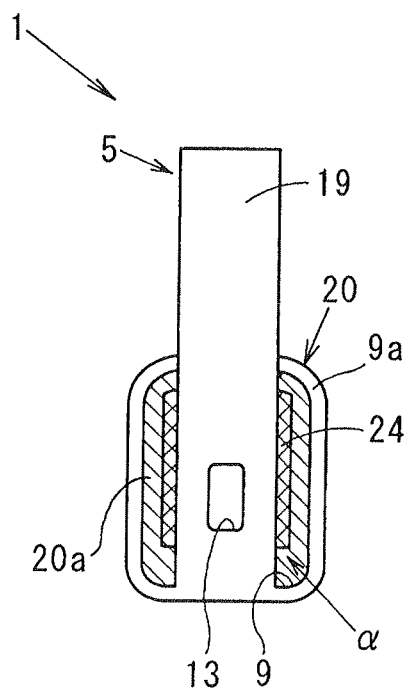
Figure 5:
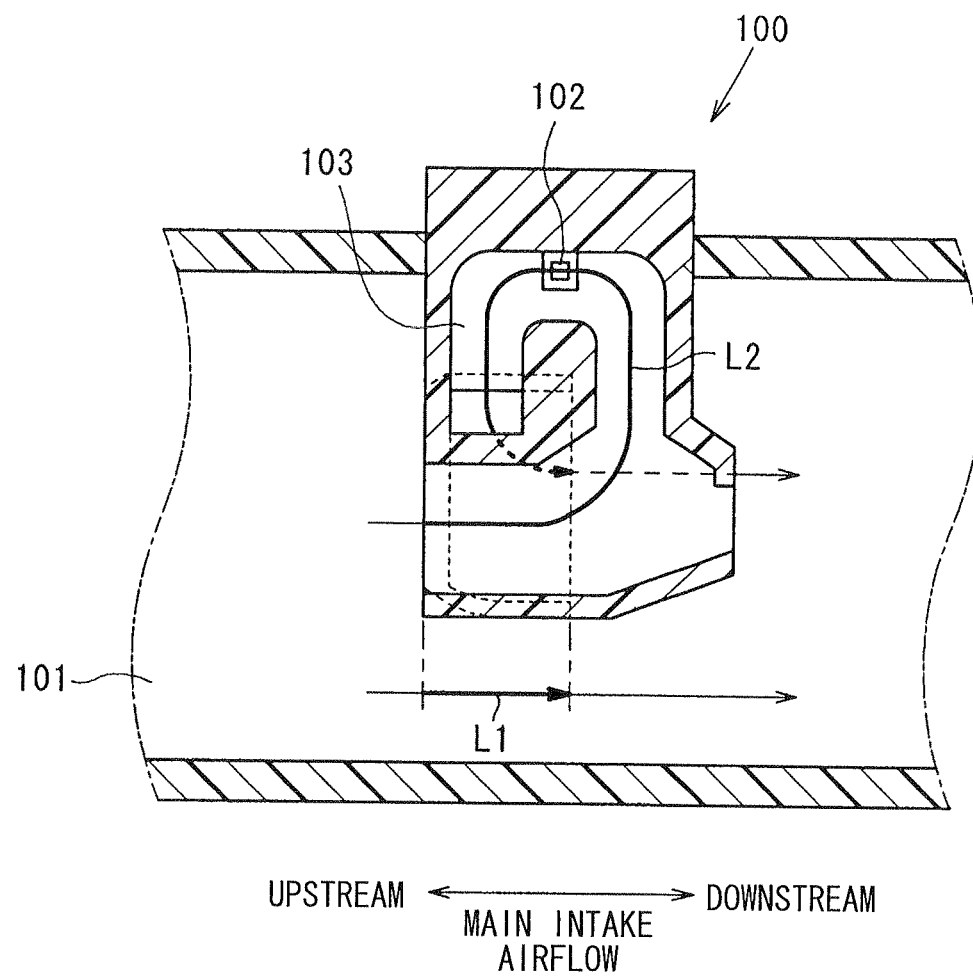
FIG. 5 is a schematic sectional view showing an air flow measurement device according to a related art.

Here, an outlet projected area a shown in FIG. 2B is provided by projecting an open area of the outlet 9 in straight and toward upstream in the flow direction of the main intake air on a projection surface perpendicular to the flow direction of the main intake air. Additionally, a hole portion 24, through which the bypass passage 4 communicates with the intake passage 2, is provided within the outlet projected area α. In FIG. 2B, an open area of the hole portion 24 corresponds to a reticulated region where diagonally-right-down hatching lines and diagonally-left-down hatching lines intersect with each other. The outlet projected area a includes both the reticulated region and a region where only the diagonally-right-down hatching lines are illustrated.

Thus, as shown in FIG. 2B, the outlet projected area a includes the open area of the hole portion 24 and an area of a passage wall portion of the bypass passage 4, which defines the fourth curved path 17d, when viewed from the downstream side of the intake passage 2. In the present exemplar embodiment, as shown in FIG. 2D, the hole portion 24 is provided by boring through a whole area of an upstream flat end portion 20a, which is an upstream part of an inner wall of the outlet cover 20 in the flow direction of the main intake air within the outlet projected area α. When a counter flow is generated periodically due to increase of an amplitude of intake-air pulsation, the counter flow having entered into the bypass passage 4 through the outlet 9 can return to the intake passage 2 through the hole portion 24. Accordingly, a flow rate of a counter flow reaching the sensor chip 3 can be effectively reduced in the air flow measurement device 1.

As a result, reduction of the measurement value of the sensor chip 3, which is caused by the increase of the amplitude of the intake-air pulsation, can be prevented in the air flow measurement device 1, because the measurement value is increased and corrected by returning the counter flow in the bypass passage 4 to the intake passage 2 through the hole portion 24 before the counter flow reaching the sensor chip 3.

Effects of the present exemplar embodiment will be described below. In the air flow measurement device 1 of the present exemplar embodiment, as described above, the outlet 9 of the bypass passage 4 opens toward the downstream side of the intake passage 2 in the flow direction of the main intake air. Moreover, the hole portion 24, through which the bypass passage 4 communicates with the intake passage 2, is provided within the outlet projected area a provided by projecting the open area of the outlet 9 in straight and toward upstream in the flow direction of the main intake air on a projection surface perpendicular to the flow direction of the main intake air.

Thus, a counter flow having entered into the bypass passage 4 through the outlet 9 can flow straight, keeping its flow direction at the time of entering into the bypass passage 4, and can thereby easily reach the outlet projected area a to return to the intake passage 2 through the hole portion 24. Therefore, even when the amplitude of the intake-air pulsation increases, influence of the counter flow on the measurement value can be limited in the air flow measurement device 1.

The outer wall surface of the outlet cover 20, which is the curved surface 22, is tapered toward upstream in the flow direction of the main intake air and protrudes outward to be curved smoothly. The downstream end of the curved surface 22 is the outlet rim 9a which define the outlet 9.

Hence, an intake air flow along the curved surface 22 can reach the outlet rim 9a surely without separating from the curved surface 22. The stably intake air flow along the curved surface 22 joins with an air flow running out from the bypass passage 4 through the outlet 9 to the intake passage 2, so that an air flow in the bypass passage 4 can be made stable. Accordingly, accuracy of the measurement value can be enhanced. In the case in which the air flow measurement device 1 includes the curved surface 22 providing the above-described effect, the outlet projected area a can be provided certainly. Therefore, the effects obtained by providing the hole portion 24 in the outlet projected area α can be exerted prominently.

Although the present disclosure has been fully described in connection with the above preferred embodiment thereof with reference to FIGS. 1 to 2D, it is to be noted that various changes and modifications will become apparent to those skilled in the art. For example, in the air flow measurement device 1 of the exemplar embodiment, the hole portion 24 is provided by boring through the whole area of the upstream flat end portion 20a within the outlet projected area α in the flow direction of the main intake air. However, the hole portion 24 may be provided by boring through a part of the area of the upstream flat end portion 20a.

FIGS. 3A to 4C show another exemplar embodiments of the present disclosure. As shown in FIG. 3A to 4C, an area ratio of a hole portion 24 to the outlet projected area α and a position of the hole portion 24 within the outlet projected area α when viewed from the downstream side of the intake passage 2 can be changed variously. Here, a manner of showing the outlet projected area α and the hole portion 24 in FIGS. 3A to 4C is similar to that in FIG. 2B.

A correction amount of the measurement value in the air flow measurement device 1 is determined in accordance with the area ratio of the hole portion 24 to the outlet projected area α and with the position of the hole portion 24 within the outlet projected area α. And generally, the more a counter flow reaches the sensor chip 3, the more an influence of the intake-air pulsation on the measurement value increases, and therefore a degree of decrease of the measurement value enlarges. Hence, in the air flow measurement device 1, a flow rate of the counter flow reaching the sensor chip 3 can be increased or decreased by changing the area ratio of the hole portion 24 to the outlet projected area α and the position of the hole portion 24 within the outlet projected area α. Therefore, the degree of decrease of the measurement value can be controlled. As a result, when the area ratio of the hole portion 24 to the outlet projected area α and the position of the hole portion 24 within the outlet projected area α are set in accordance with the degree of decrease of the measurement value of the sensor chip 3 and with the ratio L2/L1 of the bypass passage 4, the measurement value can be corrected accurately.

In the air flow measurement device 1 of the above exemplar embodiments, the downstream end of the last curved path (fourth curved path 17d) of the bypass passage 4 communicates with the outlet 9 directly. Hence, an air flow having passed through the last curved path of the bypass passage 4 immediately reaches the outlet 9 to return to the intake passage 2. However, another straight path may be added to the downstream end of the last curved path, and the outlet 9 may be provided at a downstream end of the added straight path in a flow direction of air therein.

In the air flow measurement device 1 according to any one of the above exemplar embodiments, the hole portion 24 is provided within the outlet projected area a without being shifted outside of the outlet projected area α. However, the hole portion 24 may be provided such that a part of the area of the hole portion 24 is positioned outside of the outlet projected area α in a case, for example, where the open area of the outlet 9 is made small, i.e., where the outlet projected area α is narrowed. Furthermore, in the air flow measurement device 1 of the exemplar embodiment, the sensor chip 3 is used as the example of the sensor which detects an air flow rate. However, a bobbin wound with a platinum wire may be used as an example of the sensor.

Additional advantages and modifications will readily occur to those skilled in the art. The disclosure in its broader terms is therefore not limited to the specific details, representative apparatus, and illustrative examples shown and described.

What is claimed is:

1. An air flow measurement device to be arranged in an intake passage through which intake air flows to be drawn into an internal combustion engine, the air flow measurement device being configured to introduce a part of a main flow of the intake air therein and generate an electrical signal depending on an amount of the introduced intake air, the air flow measurement device comprising
   a bypass passage through which the introduced intake air passes, the bypass passage accommmodating a senor which generates an electrical signal by heat transfer with the introduced intake air, wherein
   the bypass passage includes an inlet open toward an upstream side of the intake passage in a flow direction of the main flow of the intake air, and an outlet open toward a downstream side of the intake passage in the flow direction of the main flow of the intake air,
   a hole portion, through which the bypass passage communicates with the intake passage, is provided within an outlet projected area that is formed by projecting the outlet toward upstream and in straight in the flow direction of the main flow on a surface of the bypass passage,
   an outer wall surface of a housing having the bypass passage is exposed to intake passage,
   the outer wall surface includes a curved surface that protrudes outward to be curved smoothly and is tapered toward upstream in the flow direction of the main flow of the intake air,
   an upstream end of the curved surface communication with the hole portion without being located upstream of an inlet rim which defines the inlet,
   a downstream end of the curved surface is connected to an outlet rim which defines the outlet, and
   a correction amount of a measurement value of the sensor is determined in accordance with at least one of a position of the hole portion within the outlet projected area and an area ratio of the hole portion to the outlet projected area.

2. An air flow measurement device to be arranged in an intake passage through which intake air flows to be drawn into an internal combustion engine, the air flow measurement device being configured to introduce a part of a main flow of the intake air therein and generate an electrical signal depending on an amount of the introduced intake air, the air flow measurement device comprising
   a bypass passage through which the introduced intake air passes, the bypass passage accommodating a sensor which generates an electrical signal by heat transfer with the introduced intake air, wherein
   the bypass passage includes an inlet open toward an upstream side of the intake passage in a flow direction of the main flow of the intake air, and an outlet open toward a downstream side of the intake passage in the flow direction of the main flow of the intake air,
   a hole portion, through which the bypass passage communicates with the intake passage, is provided within an outlet projected area that is formed by projecting the outlet toward upstream and in straight in the flow direction of the main flow on a surface of the bypass passage, wherein the holes portion is separated from the inlet,
   an outer wall surface of a housing having the bypass passage is exposed to the intake passage,
   the outer wall surface includes a curved surface that protrudes outward to be curved smoothly and is tapered toward upstream in the flow direction of the main flow of the intake air,
   an upstream end of the curved surface communicates with the hole portion without being located upstream of an inlet rim which defines the inlet, and
   a downstream end of the curved surface is connected to an outlet rim which defines the outlet.

3. The air flow measurement device according to claim 2, wherein the outlet projected area is separated from the inlet.

4. An air flow measurement device to be arranged in an intake passage through which intake air flows to be drawn into an internal combustion engine, the air flow measurement device being configured to introduce a part of a main flow of the intake air therein and generate an electrical signal depending on an amount of the introduced intake air, the air flow measurement device comprising
   a bypass passage through which the introduced intake air passes, the bypass passage accommodating a sensor which generates an electrical signal by heat transfer with the introduced intake air, wherein
   the bypass passage includes an inlet open toward an upstream side of the intake passage in a flow direction of the main flow of the intake air, and an outlet open toward a downstream side of the intake passage in the flow direction of the main flow of the intake air,
   a hole portion, through which the bypass communication with the intake passage, is provided within an outlet projected area that is formed by projecting the outlet toward upstream and in straight in the flow direction of the main flow on a surface if the bypass passage,
   an outer wall surface of a housing having the bypass passage is exposed to the intake passage,
   the outer wall surface includes a curved surface that protrudes outward to be curved smoothly and is taped toward upstream in the flow direction of the main flow of the intake air, an upstream end of the curved surface communication with the hole portion without being located upstream of an inlet rim which defines the inlet, a downstream end of the curved surface is connected to an outlet rim which defines the outlet, and the housing includes:
  a main body which defines the bypass passage therein and has a pair of windows open respectively on both sides of the main body in a direction perpendicular to the flow direction of the main flow of the intake air, wherein an inside of the bypass passage communicates with outlet through the pair of windows; and
  a pair of outlet covers which cover the pair of the windows on the both sides of the main body respectively, wherein the outlet and the hole portion are defined by the main body and the outlet cover.

5. The air flow measurement device according to claim 4, wherein each of the windows is arranged between the outlet and the hole portion in the flow direction of the main flow of the intake air.

6. The air flow measurement device according to claim 4, wherein the bypass passage includes:
  a straight passage extending straight from the inlet to guide the introduced intake air in the same direction as the flow direction of the main flow of the intake air; and
  a round passage which has a round shape and makes the introduced intake air having passed through the straight passage turn in a round and flow toward the outlet through the pair of windows of the main body.

7. The air flow measurement device according to claim 6, wherein the sensor is arranged in an area of the round passage where air flows in an opposite direction from the flow direction of the main flow of the intake air.

8. The air flow measurement device according to claim 7, wherein the main body of the housing further includes a dust discharge port which opens toward the downstream side of the intake passage in the flow direction of the main flow of the intake air, the inlet communicates in straight with the dust discharge port through the straight passage in the flow direction of the main flow, and the dust discharge port is smaller than the outlet in open area.

* * * * *